US006607258B2

(12) United States Patent
Jodra et al.

(10) Patent No.: US 6,607,258 B2
(45) Date of Patent: Aug. 19, 2003

(54) PROOFING DATA FILE GENERATED BY TARGET PRINTER FACILITY

(75) Inventors: Rodolfo Jodra, Barcelona (ES); Johan Lammens, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 10 days.

(21) Appl. No.: 09/832,638

(22) Filed: Apr. 11, 2001

(65) Prior Publication Data

US 2002/0149644 A1 Oct. 17, 2002

(51) Int. Cl.[7] .................................................. B41J 2/205

(52) U.S. Cl. ............................ 347/15; 358/504; 347/19

(58) Field of Search ............................. 347/19, 43, 15, 347/14; 358/1.9, 504

(56) References Cited

U.S. PATENT DOCUMENTS 5,493,321 A * 2/1996 Zwadlo ...................... 347/131

* cited by examiner

*Primary Examiner*—Lamson Nguyen
(74) *Attorney, Agent, or Firm*—Peter I. Lippman

(57) ABSTRACT

The final-hardcopy operating facility, "target facility", converts the content provider's original data file to a different color space to form a proofing data file. A proofing facility, which is distinct from the target facility, uses the proofing file to produce a visible proof for viewing by the content provider, customer etc. A common proofing file is applied to both preparing the proof and printing the final hardcopy. Because it is the target facility rather than the content provider or the proofing facility that prepares the proofing file, using maximum available knowledge about the printing equipment which will be used and its color characterization and other technical behavior, this approach gives maximum assurance that the final hardcopy will represent the proof as accurately as practical.

41 Claims, 3 Drawing Sheets

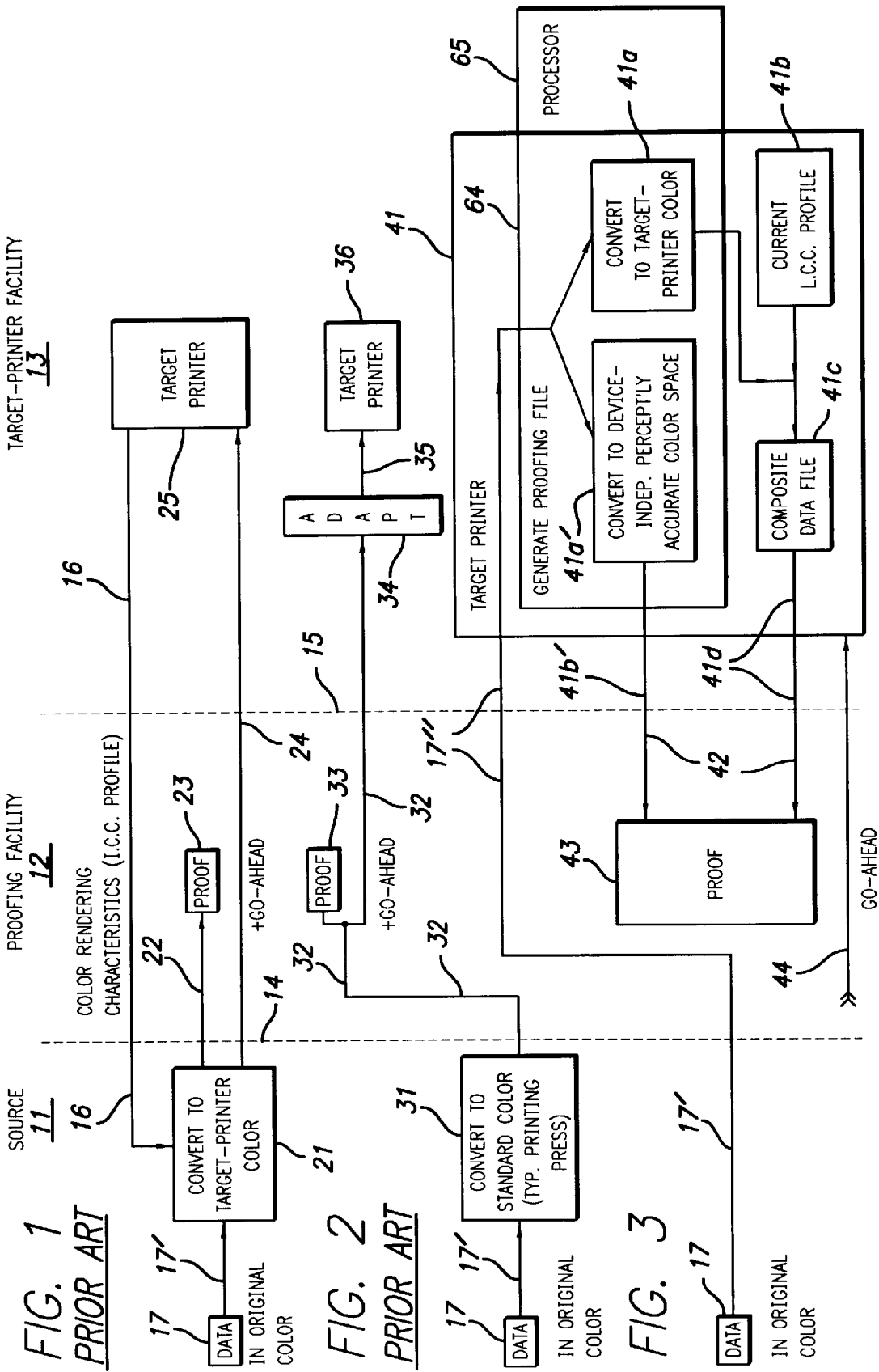

PROOFING DATA FILE GENERATED BY TARGET PRINTER FACILITY

FIELD OF THE INVENTION

This invention relates generally to machines and procedures for printing a document hardcopy at a target printer facility based upon information in an image data file; and more particularly for producing an accurate color proof at a distinct proofing facility. In general the target and proofing facilities are mutually remote, but a more important characteristic for purposes of the invention is that the two facilities be distinct in organizational or business terms.

The invention may be especially useful when either the hardcopy or the proof is produced by incremental printing—i.e. by a swath-based scanning machine and method, or by a pagewide-array machine and method, that construct text or images from individually computer-controlled placement of dots on a printing medium. Although the invention may be practiced using any of a great many different kinds of final-hardcopy printing devices and preliminary proof-producing devices, one kind of proofing device of particular interest is the Hewlett Packard line of large-format printers; exemplary description of these machines appears in U.S. utility-patent application Ser. No. 09/516,323, later issued as U.S. Pat. No. 6,312,098.

BACKGROUND OF THE INVENTION (a) Purpose of Proofing; Traditional Methods

A "proof" is a visible simulation of the appearance of an anticipated eventual hardcopy. A proof is not just a data file and traditionally is most often not associated with a data file. The general purpose of a proof is to enable printing customers and others to have a preliminary look at how the hardcopy will later appear.

Traditionally a printing facility is a unitary, integrated entity that performs essentially all functions related to a print job under one roof or at least within the scope of operations of a single commercial enterprise. The printing facility's customer, or sometimes a graphic artist or other intermediary on behalf of the customer, brings the job to the printing facility in the form of materials with written or verbal instructions for execution.

In earlier decades, any artwork that was to appear in the finished hardcopy was most usually handed to the printer in the form of so-called "camera-ready copy"—that is to say, finished art ready for the printer to photograph, so as to make offset-lithographic negatives and plates or even the earlier letterpress engravings. Any text was most commonly provided in the form of manuscript or so-called "copy", which the printer would assign to a typesetter for preparation of typeset computerized or linotype galleys.

Somewhat more recently, and particularly in the case of high artistic-quality work, an intermediary such as a graphic artist might provide artwork to the printer in the form of already-prepared color-separation negatives or even color-separation plates (or engravings). An intermediary might similarly provide text in the form of computer tapes representing the copy already keyboarded. Although some such efforts represent an effort by the customer or intermediary to control costs, more commonly both these trends are primarily in the interest of more-nearly controlling the quality and accuracy of the ultimate finished product.

The printing facility proceeds with preparations, but pauses before actually producing the final hardcopy. At that point the facility "shows a proof" to the customer or intermediary, to enable that person to see—as accurately as possible or practical—how the job will turn out.

Perhaps most typically to see the proof the customer goes physically to the printing facility where the final job will be done, and where the customer can be side-by-side with that facility's makeready people for a crucial conference about all the details, and the prospects for a satisfactory completion of the work. Where distances make a personal meeting uneconomic, in some cases proofs are instead sent by mail or courier.

Depending on the type of project, the customer may be particularly interested in seeing how faithful the colors will be in a large, display-format reproduction. In other projects the focus may be upon how well the printshop has implemented complex layout instructions for a creative multiple-fold presentation; or how precisely all the elements of a periodical have been assembled as to sequence, orientation, cropping, size, typesetting and so forth.

(b) Responsibility Allocation

Regardless of all such details or focus, the printshop does not typically show proof as a favor or courtesy to the customer, but rather somewhat the opposite. It is a mechanism for allocating to the customer any liability for errors in the finished job, if the customer fails to object to them in the proof.

The point is that all the makeready processes up to the point of showing proof, though costly, are usually significantly less than—and perhaps in most cases only a small fraction of—the total price of the job. Responsibility for the cost of printing, however, is by no means the end of legal liabilities and other obligations that can be associated with an unsatisfactory printed product.

Though the printing may be very expensive, the customer's objectives may have a value which dwarfs that expense. Another kind of consequence that is still more difficult to quantify and unpleasant to confront is the negative impact which defeated expectations exert on the crucial goodwill of a printing or graphic-arts firm.

Hence a key element in the proofing process is the customer or representative's signature approving the proof, whether with or without marked changes. In many cases the customer may call for showing of another proof, either full or partial, before finally—in industry vernacular —"signing off on the job."

A printing proprietor wants to print, and print for profit—not absorb the cost of a printjob gone wrong, or waste time and money in squabbles with customers or litigation with graphic artists. Clearly the role of a proof in the traditional commercial printing environment is enormously important.

(c) Escalated Demands in Printing

All of these traditional practices and concerns carry forward undiminished into the modern world of faster, more widely distributive commercial activities with creative new kinds of proprietary relationships. Perhaps the most important differences are that customers and their intermediaries want to see proofs faster, want to see them in a more convenient place, want them to be more accurately representative of the finished product, and generally want to push on the envelope of what can be humanly accomplished—all without error.

One modern development that is particularly important to the present invention is introduction of long-distance transactions in which a printing facility may be doing a job for a customer in a faraway city, even on a different continent. In many such situations source personnel working on behalf of the customer may go beyond providing camera-ready artwork, and text manuscript or "copy"—and even negatives and plates, as before—but now also prepare a computer data file, or great sets of files, for the printer's use in automatically generating necessary printing materials.

This trend generally continues, into the artwork and layout parts of the printing industry, the earlier introduction of typesetting computer tapes for text. Modernly such files may for example be detailed color-image data.

(d) Modern Printing in Traditional Firms

To avoid losing overall perspective, it will be mentioned here that these files can also exist in the context of a printing project that is all prepared and executed within a traditional single business and single location. In fact such data files can be very efficiently used and integrated into the flow of work within that location.

Such integrated traditional printing establishments still do exist in large numbers, and it is still common for a customer to bring an entire job to a printer in the form of some camera-ready copy, plus manuscript with layout instructions—or even with instructions for preparation of artwork by a graphic artist who works for the printshop. In this kind of situation the target facility may itself generate not only the original data file but even the artwork which is the precursor of that file.

After the data file is created, a first step is provision of the data file to makeready personnel who modify the file to prepare it for use in the printing machine that is slated to do the final hardcopy.

Then that modified file is used on a different machine, sometimes a proof press, to make a proof. Commonly in an integrated, relatively traditional shop the same makeready personnel who have modified the file also use that revised file in the proofing process; or those makeready personnel confer directly with proofing personnel.

In either case, an intimate knowledge of the character of the final hardcopy printer and its intended special adjustments and settings are thus fully available in the proofing process. Furthermore a complete characterization of that final hardcopy device is likely to pass with the job to the proofing personnel.

For instance, a device-space color characterization of that target printer may be provided to the proofing personnel. In some such situations the makeready personnel may even append or incorporate such information explicitly into the revised proofing file that is provided to the proofing crew within the same company. In a wholly local project conducted within a single organization, it is entirely natural to freely pass such information to the proofing personnel.

(e) Modern Printing in Distributive Projects

No such information flow, however, is known in projects that span two or more organizations and involve mutually remote target and proofing facilities. Here it is more natural for schedules, job priorities, printing-machine capabilities and idiosyncrasies etc. to be regarded as proprietary matters and consequently to stop at the boundaries of business organizations.

Therefore in the context of printing projects that are widely distributive geographically and in terms of different business enterprises, neither typesetting files nor image files fully eliminate the potential for surprises and disappointments in finished hardcopy. Equipment in the target facility may not be exactly the same as anticipated by the typesetter or artist who prepares the files—and, even if they are the same, they may be adjusted or configured differently, or may be loaded with different inks.

One of the most insidious and difficult sources of diverging expectations is in the setting of a target facility's printing devices to reproduce color in a slightly different color space, for instance a different so-called "device space", than envisioned by an artist, photographer or other source-associated craftsperson. Besides using fairly standard or nonstandard color spaces as such, specifications for a printjob may include special inks—in the trade often called "spot color"—that have textured, fluorescent, or glittery-fleck inclusions or simply represent a proprietary logo or trademark color.

Other parameters of a printing job that can be easily confused, misunderstood or forgotten include color corrections, cropping, scaling, bleed (forming of a photo or image that appears to run off the edge of a page), setup of signatures; size, placement and orientation of images and type; blind embossing and special registration geometries. All these variables represent powerful tools for producing effects that implement high-level creativity and professional vision on the part of artists and other printing professionals—but at the same time and by the same token they also represent ways in which things can go terribly wrong.

(f) Short-run Art Projects

The difficulties outlined above appear to be aggravated in extremely high-quality, short-run projects such as art reproductions. In such cases, since makeready operations must be amortized over a relatively small number of prints, the overall cost per hardcopy is proportionately high—while demands on technological performance are especially stringent, particularly as to color accuracy.

Due to these characteristics, many kinds of short-run art projects are nowadays becoming the province of the printing industry's incremental-printing branch, where no negative, plate or engraving is required. Until relatively recently, incremental printing was known only in small, desk-size office or personal copiers.

This is no longer so. Prime contributors to the expansion into large-format, fine-quality capability are machines designed at Hewlett Packard Espanola, in Barcelona.

Virtually all makeready for incremental printing is performed within a computer—perhaps the only exception being loading of special inks into the machine. Furthermore, proofs are themselves almost by definition short run; therefore they too are natural applications for the modernly emerging field of incremental printing.

It is for these reasons that the present invention may be of particular utility in incremental printing. The invention itself, however, is not thus limited.

(g) Intermediate-technology Proofs

Another relatively modern development is that the printer may send a proof to the customer or graphic artist by facsimile transmission or by electronic mail. In such tactics, however, there is great potential for trouble, due to lack of standardization in color-reproduction capabilities of remote receiving apparatus and in viewing arrangements.

(h) Third-party Proofers and Other Operators

A step in the right direction is emergence of third-party professional proofing facilities 12 (FIGS. 1 and 2), which may tend to have industry-standard, state-of-the-art equipment—and also may tend to use somewhat better-standardized adjustments, configurations, device-space settings and so forth. Both the final or "target" printing facility 13 and the source (customer or customer's representative) 11 are more comfortable with placing their confidence in that kind of service operation.

As a practical matter, some proofing facilities may themselves be printing companies that happen to be more local to the customer or artist—but in general are not part of the same enterprise as the printing firm that will do the final work. While the proofer is ideally much closer to the customer than the target facility is, that latter firm may attract the final-hardcopy printing in any of a great variety of ways.

For instance, the target facility may have very highly specialized equipment, or may be in a state (such as several in the southeastern part of the United States) or country (such as Indonesia or Thailand) where labor or real-estate costs are low and the going rate for long-run or high-quality work is accordingly depressed. Alternatively the target facility may simply be located near the point of intended final use, so that delivery can be made without high cost, delay or added risk of damage in transporting of heavy and bulky pallets of printed materials.

In some major commercial centers, on the other hand, the proofing facility may not do any final-run printing of its own but rather may simply exist to serve the high traffic in out-of-the-area final hardcopy printing. In either case the proofer is generally only a collaborator with the printing firm, not a part of the printing firm, since it would be impractical for most printers to maintain their own offices in every major city or region where customers might materialize.

Hence the modern commercial environment naturally gives rise to the existence of proofing facilities that serve a very valuable purpose. They work hand-in-hand with customer and intermediary, as a new kind and new level of intermediary—in some cases more closely associated with the printer than with the customer and in other cases the opposite, but in any event proprietarily distinct from both.

In passing it is worth mentioning that further elaboration of interenterprise relationships can occur elsewhere in the chain, particularly with the customer engaging an advertising agency, which may in turn hire a freelance graphic artist or a job-shopper to interface with the printer through the proofer, and so on. All these relationships have their suitable place in the picture, depending upon the capabilities and constraints of the various participants.

(i) Problems in Third-party Proofing

Previous discussion has explored the flow of work (including data files) in a relatively traditional, integrated printshop. This present subsection specifically addresses operations in the more modern, distributive kind of working scheme.

If an input image-data file 17 (FIGS. 1 and 2) is used in this type of operation, one entity which commonly uses that file to generate a proofing file is the proofing facility. This method, although dominant in this niche of the industry, is highly questionable.

As target operations become progressively more complex, more and more information has to go into the proofing. This trend places extreme demands upon the accuracy of that information.

An even more dangerous practice is for an originator of the image data—a person who lacks any affiliation with the target facility—to try to define the proofing file. Development of the proofing file by either a proofing facility or an image-data creator is an invitation for error of several different types to creep into the system.

Departing from traditional-shop workflow described earlier, here the precise detailed character of the target printer is outside the information set of the person undertaking to put together the proofing file. Even if such information is available, while that person is making the proofing file the target facility may be changing adjustments to the color rendering transform used in the target printer.

Even after the proof is made, the target facility may make other such changes—or some other new, higher-priority job may bump the subject project to a different machine entirely. While the present invention is particularly effective in very sophisticated projects involving extremely touchy color characterizations, it is also effective in helping to control simple problems arising out of mere complexity in a job.

For instance target-facility personnel may confirm verbally or even in writing the shipping destination of the finished hardcopy, or even identification of the job itself. Spot color or related adjustments in colorimetry may be similarly confirmed, as may cropping, scaling and layout instructions.

None of these precautions is likely to halt the process or sound an alarm when personnel along the way are distracted by events on the job or inattentive due to personal concerns. The object of a proofing process, again, is to prevent undesired characteristics in an ultimate hardcopy output; but the process as described above is flawed and has only a middling-to-good chance of accomplishing that objective.

In a sense, the problem is that partial automation is dangerous: automation tends to lull people into thinking that the machinery is handling the job and will do so correctly; but this particular segment of the workflow path is outside the automatic-control model. Thereby the door is opened to human error—which as a practical matter can never be entirely avoided, and which may materialize in the form of agreements that have been forgotten, instructions that have been mislaid, and misunderstandings that have never been recognized.

The result, if it includes failure to deliver publication materials when needed critically, may be utterly incurable. Even in lesser catastrophes, the result may include lost profit—and all the difficulties of allocating liability for it—or the actual delivery of final hardcopy that is unacceptable, though expensive in the extreme.

Yet the printing business is extraordinarily competitive. Any solution to these problems, if it is to be accepted, must be one that imposes an absolute minimum of added cost and delay.

In one third-party proofing arrangement, the process may begin with provision of color-rendering characteristics (an I. C. C. profile) 16 from the target printer 25 to guide a conversion process 21 that may be performed by the source—or preferably, but less commonly, by the proofing facility 12. (The initials "I. C. C." stand for the "InterColor Consortium", which has developed an industry standard.)

The conversion process 21 also receives an image data file 17, 17' and—based upon the target-printer profile 16—prepares an equivalent file 24 in target-printer color space (in other words, in device-color space). This file 24 in principle should produce perfect rendering at the target printer 25.

First, however, the input data 17 themselves, or the adjusted file 24, or possibly a modification in perceptual color space, is used as a file 22 in the proofing facility to prepare a proof 23. Whichever of these three possible genealogies may have been its actual origin, ordinarily the proofing facility can be relied upon to use this file 22 to produce a proof 23 that is entirely true to the assumptions implicit in the selected path, and thus is accurate within those assumptions.

That kind of accuracy is certainly sought, but nevertheless may in fact fail to serve the purpose. What is needed is correspondence between the proof 23 and the final hardcopy output that will result if the converted file 24 is passed with a "go ahead" instruction (based upon examination of the proof) to the target printer 25.

Unfortunately, as printing equipment becomes ever more sophisticated—and offers ever greater variety in the ways color and other printing details can be implemented —even reasonably well-standardized apparatus and settings 16 can be unintentionally made different from what a graphics house or primary customer has in mind. As noted in this background section, personnel in the target-printer facility 13 can quite innocently make changes in settings and characteristics of the target printer 25 that negate the profile characteristics 16 supplied.

Such a variation is all it takes to invalidate the assumed correspondence between proof and final hardcopy —notwithstanding accuracy in the conversion or other process used to generate the proofing file 22. All of the parameters mentioned in the preceding section of this document, and others, are subject to variation and thereby can generate dissatisfaction with results.

In another representative third-party proofing arrangement, the input data 17 undergo a conversion 31 (FIG. 2)—again either at the source or preferably at the proofing facility—into some standard color space, most usually another device space such as that of a typical printing press (as distinguished from that of the specific target printer 36).

The converted data 32 pass to the proofing facility's proofing system, which here too accurately applies suitable transformations to generate a proof 33. In this case furthermore if the proof is approved the same converted data 32 proceed to the target-printer facility 13.

The latter, however, must now apply an adaptation 34 to develop a final data file 35 for use in the target printer 36. The character of the adaptation can be relied upon to correctly prepare for printing in the target printer 36, taking into account the conversion 31 used by the proofer.

The adaptation 34 also, unfortunately, takes into account up-to-the-minute information about the true condition of the target printer 36, which information regrettably is unknown to personnel of both the proofing facility 12 and source 11. It would hardly be appropriate to omit such information from the adaptation 34, since otherwise the adaptation would be wrong on its face.

In fact, some aspects of the adaptation 34 may be called for—within the specialized knowledge of personnel at the target facility 13—specifically by job specifications called out in writing by source personnel. It is, ironically, precisely such special requirements (perhaps not fully considered in the proofing facility 12) that can be the immediate cause of mismatch in the proofing process.

(j) Conclusion

As this discussion shows, limitations in proofing reliability for interenterprise printing projects continue to impede achievement of uniformly excellent final-hardcopy output in high-quality color reproductions and other challenging specialties, especially short-run work. Thus important aspects of the technology used in the field of the invention are amenable to useful refinement.

SUMMARY OF THE DISCLOSURE

The present invention introduces such refinement. In its preferred embodiments, the invention has several aspects or facets that can be used independently, although they are preferably employed together to optimize their benefits.

In preferred embodiments of a first of its facets or aspects, the invention is a method of generating an advance proof of an image that is to be printed at a target printer facility. The printing there is to be based upon an original image data file in a particular color space.

In this document the phrase "target printer facility" includes a printer that will be used to make a final hardcopy printout of the image—and, most typically but not necessarily, associated with that printer a computer which performs all or portions of the functions of substantially directly controlling the printer. The target facility typically also includes other related apparatus. As to some printers, equivalent computing capabilities are not "associated with" the printer but rather are wholly incorporated into the printer itself; this too is of course encompassed within the phrase "target printer facility".

As an opposite case, people familiar with this field will understand that in some situations an associated computer is not necessarily in the same room or even the same premises as the printer. Instead such a computer may instead be quite remote—even on a different continent—and may be associated with the printer through a network connection, modernly even an Internet connection.

Thus the concept of a target printer facility or "target facility" is to be understood broadly as encompassing a printer with integrated but substantially direct control system, however structured. This concept will shortly be made more clear through examples and also through discussion of contrasting arrangements and complementary facilities.

The method includes the step of converting the original file to a different color space than the original color space, to form a proofing data file. This converting step is performed by the target facility. The method also includes providing the proofing file to a proofing facility which is distinct from the target facility. This providing step need not be performed by the target facility.

The concept of a distinct proofing facility is complementary to that of the target facility or "target printer facility". The proofing facility includes some apparatus that makes a proof—that is, a visible representation of the image substantially as it will appear in the final hardcopy printout to be made by the target facility.

In the printing industry the concept of a proof is traditional and extremely common. As will be seen, for purposes of the present document the proof can be but is not necessarily itself a hardcopy.

Like the target facility, the proofing facility may be all in a single room and embodied in an evidently single, unitary apparatus or may be distributed. Portions may be in very remotely different places.

As a matter of industrial practice according to the invention, the proofing facility is perhaps most typically —but not necessarily—remote from the target facility. From the earlier discussion of the target facility, however, it will be clear that distance as such is not an important consideration in determining whether a particular piece of apparatus is part of the proofing facility or not —or is part of the target facility or not.

A stated characteristic of the proofing facility is that it is distinct from the target facility. It is important to establish what this means.

Of course the two may be wholly separate operations in different cities. On the other hand, for instance one computer terminal that is part of the proofing facility may be physically adjacent to a computer terminal that is part of the target facility.

Such physical adjacency in itself is not dispositive one way or the other. The two facilities may yet be either "distinct" or not.

These two adjacent terminals may even have some form of interconnection for exchanging data. If this interconnection and the data exchange in the interconnection are completely automatic, and the processing of data in both terminals and in the remainder of their respectively associated facilities is likewise completely automatic, then there may appear no basis for drawing a distinction between the two facilities.

In such a case the two facilities are not distinct. The conclusion will be opposite, however, if some element of divergent human control (different people controlling the two machines) or divergent human intervention appears in association with that physical interconnection, as to the transmission or reception of the data.

Such divergent human intervention may for instance take the form particularly of recognizing that the data are going to or coming from a different legal entity; or in deciding how to use the data in determining how to proceed in dealing with the image and its eventual hardcopy printout for purposes of a different legal entity.

In other words, in this rather extreme case—intentionally introduced for the purpose of illustrating how fine the distinction between facilities may be—the line of division may be exclusively one of different ownerships of relatively closely linked physical apparatuses representing the two entities, or exclusively one of very distinctly different human control on the two sides of the line.

It will be understood, however, that what has been discussed above is a particular extreme case in which relatively great care is required to draw a plain line between the two facilities. In the very large majority of cases, the determination will be much more straightforward and clear as the two facilities will be cleanly distinct in physical, functional, commercial and proprietary terms.

The foregoing may represent a description or definition of the first aspect or facet of the invention in its broadest or most general form. Even as couched in these broad terms, however, it can be seen that this facet of the invention importantly advances the art.

In particular, it is the target facility—rather than the proofing facility as in the most-relevant prior art—which generates the proofing file. This method is therefore far more reliable, because the more complex the target operations, the more information has to go into the proofing and the more accurate that information must be.

When it is the proofing facility (or even more undesirably a target-facility-unaffiliated person who originated the image data) that undertakes to define the proofing file, myriad insidious sources of error can intervene. A printer profile supplied by the target facility to the proofing facility just last week, or yesterday, may no longer be applicable today.

Some special instructions, too, for scaling, cropping, custom colorimetric adjustments, spot color, and even job identification or destination may be present in a proofing file supplied by the proofing facility (or image-originating personnel)—and these may be "confirmed" by target-facility personnel verbally—but when it is the target facility itself physically incorporates them into the proofing file, they are more-nearly confirmed really.

Although the inventive method described above is only for generation of a proof, and thus does not include final printing of a hardcopy as a step, it is helpful to bear in mind that ordinarily the target facility will in due course print a final hardcopy, and the object of a proofing process is to reduce the incidence of undesired characteristics in such ultimate hardcopy outputs. In particular, the procedure described enables actual application of the target facility's proofing data file by the proofing facility, in producing a proof—shortly before anticipated final hardcopy printout by the target facility.

Thus the invention has an automatic, built-in hedge against misunderstandings, mislaid instructions, forgotten agreements, and other forms of virtually unavoidable human error. In this way the invention yields much lower incidence of extremely expensive unacceptable final hardcopy, of difficult-to-allocate liability for lost profit—and of major incurable damage through failure to timely provide critically needed publication materials.

Although the first major aspect of the invention thus significantly advances the art, nevertheless to optimize enjoyment of its benefits preferably the invention is practiced in conjunction with certain additional features or characteristics. In particular, preferably the converting step converts the original file into either target-printer native color space or a perceptual color space. Also preferably the method includes the step of applying the proofing file to produce a proof—a step that is performed by the proofing facility.

Another preferable step is that of the target facility receiving the original file. As will be seen, most typically but not at all necessarily the original file is received from target-unaffiliated personnel involved in generating the original artwork—and in many cases received through the intermediary of the proofing facility.

This step is described as "preferable" because in practice the target facility may itself generate the original file. This perhaps anomalous-seeming arrangement may arise in any of a variety of ways, many of which have analogs in conventional practice that will be recognized as commonplace.

One way in which this may occur, as mentioned earlier, is that the target facility may actually be an employer of the art personnel. Another is that the tasks of the target facility may include assembly of many different small pieces of a job, received piecemeal from one or plural sources. Also these two modes of work may occur in combination.

Another pair of preferences, which are alternative to each other, are that the proof be either a computer-generated volatile display or a hardcopy. A volatile display in turn may take the form of a computer monitor (whether a cathode-ray tube, liquid-crystal display, or other type) or of a projection display on a screen.

A hardcopy proof may be made on a very different kind of printing device from the target printer. For instance, the proofing file may correspond to a page size larger than the proofing facility can print; in this case the proofing file is preferably subdivided into data subsets individually sized for printing in the proofing facility.

Such subdividing can be performed by the proofing facility, and this is within the scope of certain of the appended claims; however, this approach is not most-highly preferred as it appears to sacrifice more than necessary of the desirable objective that a common proofing file be used to produce both the proof and the final hardcopy. That goal may be more closely realized by assigning to the target facility the task of forming a subdivided derivative of the proofing file—or, naturally, of a substantial duplicate of the proofing file.

In general, again, the target facility is better able to maintain the integrity of the simulation, through most kinds of transforms (particularly including a subdivision) than the target facility. In this approach at least a common proofing file is applied—and most-accurately applied—to produce both the proof and the final hardcopy.

Volatile and hardcopy proofs, in any event, have their respective drawbacks and advantages. A volatile proof may show colors in a nominally representative fashion, and may also show cropping and other characteristics of the desired treatment.

In general, however, a volatile proof cannot effectively show print-medium effects or metameric effects. Such effects are color similarities and differences that appear when an inked image is viewed under different lighting—e.g. skylight, direct sunlight, fluorescent lamps of different types, incandescent lighting at different color temperatures etc.

On the other hand, a volatile proof usually is far preferable in terms of speed of presentation (particularly for remote viewing), economy of production, and all-around convenience. With sufficient attention in programming, a volatile proof may adequately represent the relationships of image size to page size, and the cropping, trimming, bleed and general layout of signatures, etc.

Another preference is that the converting and providing steps be performed automatically. By this it is not meant to suggest that automaticity necessarily extend to the physical makeready of a press, but rather only to the computations involved in transforming color and other image characteristics from the original data-file form into native target-printer form; and to the steps required for forwarding the data in this latter form to the proofing facility.

From the advantages of the invention as described above, it will be understood that automaticity can enhance the favorable effects of the invention by further reducing intrusion of human error. Complete automaticity both in and between the target and proofing facility, however, if coupled with common proprietorship and control may indicate that facilities are not distinct and the invention therefore not present.

Another preference is that, before the applying step, the target facility perform another step of registering with the proofing facility a target printer and corresponding color characterization profile. A subpreference in this case is that, after this registering step and before the supplying step, image-generation personnel perform the step of retrieving that registered color profile and using the profile to refine the data—so that, at the very outset, they can specify a more nearly desired hardcopy color at the target printer.

Yet another preference is that the method also include the step of the proofing facility also applying a target-printer color-characterization profile in producing the proof. For this preferred form of the invention, virtually the only limitation on the target printer is that it in fact have such a profile. There are two ways in which this step may be implemented.

First it is ideal that the providing step include provision by the target facility to the proofing facility, substantially concurrently, of a target-printer color-characterization profile. In this case, preferably the proofing facility also applies this particular target profile in producing the proof.

The point here is that this procedure minimizes the likelihood of a change in the target-printer profile between the time when the proofing facility acquires the target profile and the time when the final hardcopy is made. Nevertheless, a second way in which the proofing facility can apply a target profile in producing the proof is that the target facility provide a target profile to the proofing facility earlier—and the proofing facility store this information for use in proofing.

For example, as mentioned above the target facility preferably registers the target printer with the proofing facility, and at the time of registration provides a then-current target profile. As can now be understood, however, it is far preferable for such early, and generalized, profile data to be used only by image-generation personnel, and only in preparing a rough first cut at the original data file. In commercial-liability terms it is rather dangerous for the proofing facility and the customer or image-generation personnel to actually rely, at final hardcopy time, upon such a relatively early profile.

Still another preference is that the proofing facility be remote from the target facility. As mentioned earlier, this preferred characteristic is likely most typical but is not necessary.

It is also preferable that the converting step be performed either by a processor in a target printer at the target facility, or by a processor in a computer interconnected with the target printer. It is also preferable that the proofing file further include information about the image, such as may beneficially form part of a positive, technical confirmation to the proofing facility of job specifications—including for instance:

cropping,
page placement,
scaling multiple,
spot color,
an image-document name,
an image-document date,
identification of one or more people associated with the image, and
identification of one or more organizations associated with the image.

The phrase "scaling multiple" refers to an image-dimension adjustment.

Craftsman in the traditional printing arts may conceive of such adjustment in terms of visible dimensions (and indeed may be accustomed to implementation through optical projection devices); while digital-image technicians may instead conceive of the process in terms of changes in resolution (with implementation through computerized calculations e.g. including interpolation). Both conceptualizations are valid and within the scope of the present invention.

The phrase "spot color" refers to specification of a special ink, which may include any of an extremely large variety of coloring materials as explained earlier. People and organizations included in the proofing file may likewise be quite diverse. They may—merely by way of example—include a customer, an artist, a proof house that operates the proofing facility, a printing house that operates the target facility, or a third or fifth party that is to receive shipment of the finished hardcopy as a beneficiary of the overall process.

Another preference is that the proofing file be at a coarser resolution than the original file. Generally speaking, except in perhaps the most demanding of fine-art projects, color as well as mechanical specifications can be evaluated quite adequately from a coarser-resolution proofing file and proof.

Another preference, somewhat related, is that the converting step include transforming the data into rasterized form, as part of creating the proofing file. Many original files are not raster or bitmap files but rather vector or vector-equivalent (e.g. text)—and at some point before actual hardcopy printing must be rasterized.

For instance in incremental printing rasterization is required to enable printmasking. In more-traditional printing arts, rasterization is at least required in the process of making an offset-litho plate or engraving—if not before.

In any event a bitmap or raster file is much closer to a final, printing-machine-language representation than is a vector file; and accordingly is subject to much less interpretation and associated ambiguity. In a word, the raster file is more stable.

Some print jobs are extremely color sensitive for particular colors—again company logos, for instance, and very similar colors with fine distinctions between them. (Such concerns are far from imaginary; to the contrary they have been compiled from actual complaints of printed-hardcopy recipients.) Therefore use of the rasterized file—some form of which must eventually be made anyway for printing—as the proofing file is very helpful to still further reducing the possibility of mismatched understandings about the final outcome of the project.

Since raster files, however, are usually much larger than vector files, transmission of a full-resolution raster file as a proofing file may be very time consuming and expensive. Furthermore, the proofing printer may very well require downsampling (resolution reduction) in production for its own printing, if it receives a full-resolution proofing file.

Thus the preference stated just previously—of the proofing file being reduced in resolution for transmission by the target facility to the proofing facility—serves two purposes: (1) it reduces the time and cost of transmitting the data, and (2) because the rasterization and resolution reduction are performed by the target facility, which better knows the peculiarities of its own target printer, the overall process is once again less subject to corruption by misunderstandings about the nature of the rasterization process to be performed at the target facility. That process has already been done in production of the proof.

Some other operational preferences will now be introduced. Although these operations have their plain analogs in traditional commercial work, the overall method resulting from combination of these operations with the novel, inventive steps described above is believed to be even more strikingly novel and inventive. That is, these preferences represent an ingenious integration of the invention into commercial practice in a way that conventional practitioners will find comfortable and natural—all the while achieving the above-outlined great benefits of the basic invention.

One of these operational preferences is that the method also include the steps of:

before the supplying step, image-generation personnel presenting the original file to the proofing facility and requesting a proofing document from the proofing facility; and the proofing facility then performing the supplying step and also requesting a proofing file from the target facility.

Another of these operational preferences is inclusion of these further steps, to be performed by the image-generation personnel:

viewing the proof;

annotating the proofing file based on viewed color quality of the proof; and furnishing the annotated proofing file to the proofing facility.

Yet another operational preference is that the method include the steps enumerated below. It will be seen that these steps, though set out somewhat in long form, represent essentially an iteration—based upon the first-above-described proof—of the fundamental process steps described earlier:

the image-generation personnel viewing the proof, refining the original file based on viewed color quality of the proof, and supplying the refined file to the proofing facility;

the proofing facility supplying the refined file to the target facility with a request for a refined proofing file;

the target facility converting the refined file into target-printer native color space, to form a refined proofing file;

the target facility providing the refined proofing file to the proofing facility;

the proofing facility applying the proofing file to produce a refined proof; and the image-generation personnel viewing the refined proof and approving it.

As will be apparent, most of the preferences described above in regard to the first main facet of the invention are equally applicable in practice of the other main aspects of the invention, which are introduced below.

In preferred embodiments of its second major independent facet or aspect, the invention is a method of printing an image, based upon an original image data file in a particular color space. The method includes the step of a target-printer facility converting the original file to a different color space, to form a proofing data file.

It also includes the steps of provision of the proofing file to a proofing facility distinct from the target facility; and the proofing facility applying the proofing file to produce a proof.

This method also includes the step of the target facility applying that proofing file to produce a final hardcopy of the image. Through this process, that proofing file—which is to say, the same proofing file—is applied to producing both the proof and the final hardcopy.

The foregoing may represent a description or definition of the second aspect or facet of the invention in its broadest or most general form. Even as couched in these broad terms, however, it can be seen that this facet of the invention importantly advances the art.

In particular, this method actualizes the relatively abstract previous discussion of the ultimate hardcopy printout by the target facility. All of the incipient benefits to be realized in principle—in the practice of the proofing method that is the first aspect of the invention —can now be seen as realized actually in the present printing method.

Although the second major aspect of the invention thus significantly advances the art, nevertheless to optimize enjoyment of its benefits preferably the invention is practiced in conjunction with certain additional features or characteristics. In particular, some of the previously mentioned preferences for the first facet of the invention can be mirrored here. Preferably:

image-generation personnel supply the original file, in the particular color space, to the target printer facility;

image-generation personnel view and approve the proof;

the providing step includes the target facility also providing to the proofing facility substantially concurrently a color characteristic profile of the target facility;

the converting step includes transforming the data into rasterized form, as part of creating the proofing file;

the proof is a hardcopy;

the proofing file corresponds to a page size larger than the proofing facility can print, but can be subdivided into data subsets individually sized for printing in the proofing facility (in the second aspect of the invention as here described, this subdivision is most naturally conceptualized as performed in the proofing facility, but the contrary will be seen below in another separate aspect of the invention);

the converting and providing steps are performed automatically;

the target facility associates with the proofing file a target-printer color-characterization profile;

the proofing facility also applies such an associated target profile in producing the proof; and the proofing facility is remote from the target facility.

In preferred embodiments of its third major independent facet or aspect—as with the second—the invention is a method of printing an image, based upon an original image data file in a particular color space. Also as in the second aspect, this third facet includes the early step of a target-printer facility converting the original file to a different color space, to form a proofing data file.

Also common to both these aspects are certain later steps. One such step is the target facility's using (but here we shall say "applying") the proofing file to produce a final hardcopy of the image.

Intermediate steps of this method, however, differ importantly. One such step of the present aspect is the target facility's application of the proofing file—or, again, a substantial duplicate of that file—to form a subdivided derivative of the proofing data file.

Other such steps are provision of the subdivided derivative file to a proofing facility distinct from the target facility, and the proofing facility's application of the subdivided derivative to produce a proof in subdivided portions. Thereby the proofing file (once again, a common proofing file) is applied to producing both the proof and the final hardcopy.

The foregoing may represent a description or definition of the third aspect or facet of the invention in its broadest or most general form. Even as couched in these broad terms, however, it can be seen that this facet of the invention importantly advances the art.

In particular, this aspect of the invention implements the earlier-mentioned most-advantageous way of realizing the benefits that flow from applying a common file in production of both a proof and a final hardcopy, by distinctly different entities.

Although the third major aspect of the invention thus significantly advances the art, nevertheless to optimize enjoyment of its benefits preferably the invention is practiced in conjunction with certain additional features or characteristics. In particular, preferably the proofing file corresponds to a page size larger than the proofing facility can print; however, the subdivided derivative comprises respective data subsets of the proofing file that are individually sized for printing in the proofing facility.

In preferred embodiments of its fourth major independent aspect or facet, the invention is a system for printing an image, based upon original image data. Those data are in a particular color space, and supplied by image-generation personnel. It will be understood that the image, the data, and the image-generation personnel are all only parts of the context or environment of the invention as broadly described here—not elements of the inventive system itself.

(In the bodies of those of the appended claims directed to apparatus, e.g. to the system under discussion here, the term "such" is used instead of "the" or "said" in referring back to parts of the environment or context expressed in the preambles of those claims. The purpose of this convention is to more particularly and distinctly emphasize which features are elements of the invention.)

The inventive system includes a target printer facility, including a target printer. The facility receives the data from the personnel and converts the original data to a different color space to form proofing data.

Also included, but distinct from the target facility, is a proofing facility that receives the proofing data and applies the proofing data, together with a color characteristic profile of the target facility, to produce a proof. The target facility also applies those proofing data to print a final hardcopy of the image.

Thus both production of the proof and printing of the final hardcopy are effectuated from application of the proofing data in common. Even though this system overall is distributive, as between at least the two facilities described, the system nevertheless achieves the advantages of minimizing misunderstandings, enhancing reliability in printing a final hardcopy that is what everyone expects to see, and avoiding unsatisfactory deliveries with their associated liabilities—all as mentioned earlier for the method aspects of the invention.

In preferred embodiments of its fifth major independent facet or aspect, the invention is a target printer facility. Its purpose is printing a final hardcopy of an image based upon original image data, in a particular color space, and cooperating with a proofing facility that is distinct from the target facility.

From the foregoing it will be understood that the image data, the hardcopy, and the proofing facility are not elements of the invention in its fifth main aspect—but rather are parts of the context or environment of the invention. The image data are supplied by image-generation personnel.

The target printer facility includes a target printer that prints the final hardcopy of the image, and a communication link for receiving such data from such personnel. It also includes one or more computer subsystems for converting such original data to a different color space to form proofing data.

In addition the fifth facet of the invention includes a further communication link. This link is for transmitting the proofing data to such distinct proofing facility for use, together with a color characteristic profile of the target facility, in producing a proof.

The foregoing may represent a description or definition of the fifth aspect or facet of the invention in its broadest or most general form. Even as couched in these broad terms, however, it can be seen that this facet of the invention importantly advances the art.

In particular, this aspect of the invention provides the target facility which—through interaction with a complementary proofing facility—makes possible the benefits of the system and method facets of the invention discussed above. Though the fifth major aspect of the invention thus significantly advances the art, nevertheless to optimize enjoyment of its benefits preferably the invention is practiced in conjunction with some of the preferences outlined above for earlier aspects of the invention.

In preferred embodiments of its sixth major independent facet or aspect, as with the fifth, the invention is a target printer facility for printing a final hardcopy of an image, based upon original image data, in a particular color space, supplied by image-generation personnel; and for cooperating with a proofing facility that is distinct from the target facility. Thus once again this language indicates that the proofing facility, image data, and hardcopy are parts of the environment of the invention, not elements of the invention itself.

The target printer facility includes a target printer that prints the final hardcopy of the image, and a communication link for receiving such data from such personnel. It also includes one or more computer subsystems for converting such original data to a different color space to form proofing data.

The target facility also includes a further communication link for transmitting the proofing data to such proofing facility for use, together with a color characteristic profile of the target facility, in producing a proof. The target printer and computer subsystems comprise means for applying the proofing data to print the final hardcopy. Thereby a common proofing file is applied both to producing the proof and to printing the final hardcopy.

The foregoing may represent a description or definition of the sixth aspect or facet of the invention in its most general or broad form. Even as couched in these broad terms, however, it can be seen that this facet of the invention importantly advances the art.

In particular this facet of the invention, like the fifth, establishes a target printer facility which enables the advantages of the first through fourth aspects—but here with a focus upon the earlier-discussed benefits of using a single file of data for both producing a proof and printing a final hardcopy. Again the preferences for the previously introduced facets of the invention are applicable here too.

In preferred embodiments of its seventh major independent facet or aspect, as for the fifth and sixth, the invention is a target printer facility for printing a final hardcopy of an image, based upon original image data, in a particular color space, supplied by image-generation personnel; and for cooperating with a proofing facility that is distinct from the target facility. The target printer facility includes a target printer that prints the final hardcopy of the image, and a communication link for receiving such data from such personnel.

Also included are one or more computer capabilities for converting such original data to target printer native color space to form proofing data. The target facility also includes a further communication link for transmitting the proofing data, together with a color characteristic profile of the target facility, to the distinct proofing facility for use in producing a proof.

The foregoing may represent a description or definition of the seventh aspect or facet of the invention in its broadest or most general form. Even as couched in these broad terms, however, it can be seen that this facet of the invention importantly advances the art.

In particular, this aspect of the invention too defines a target facility which—in conjunction with a complementary proofing facility—brings into existence the favorable conditions that flow from proofing from the same file as used in printing. This facet of the invention goes further in that this file is specifically provided to the proofing facility by the target facility.

In preferred embodiments of its eighth major independent facet or aspect, the invention is exactly such a complementary proofing facility. That is, it is a facility that produces a proof of an image, based upon a proofing data file; and that cooperates with a target printer facility which is distinct from the proofing facility and which prints a final hardcopy of the image. This preamble expressly indicates that the proof, data file, hardcopy, and target printer facility are parts of the context of the eighth aspect of the invention—not of the invention itself.

The proofing facility includes a device for producing the proof, and a communication link for receiving such proofing data file from such target facility. Also included are one or more computer subsystems for using such proofing data, together with a color characteristic profile of such target facility, in controlling the proof-producing device to produce a proof.

The foregoing may represent a description or definition of the eighth aspect or facet of the invention in its broadest or most general form. Even as couched in these broad terms, however, it can be seen that this facet of the invention importantly advances the art.

In particular, this aspect of the invention provides a proofing facility which enables the attainment of the advantages asserted earlier for the integrated system and the method facets of the invention. The preferences articulated above for those previously described facets are applicable here as well.

In preferred embodiments of its ninth major independent facet or aspect, too, the invention is a proofing facility for producing a proof of an image, based upon a proofing data file and a color characteristic profile of such target facility. The invention is also for cooperating with a target printer facility that is distinct from the proofing facility and that prints a final hardcopy of the image based upon said proofing data file.

The proofing facility includes a device for producing the proof; and a communication link for receiving, from such target facility, such proofing data file and such color characteristic profile. It also includes one or more computer subsystems for using such proofing data and such color characteristic profile, together, in controlling the proof-producing device to produce a proof. Thus a common proofing file is applied both to producing the proof and to printing the final hardcopy.

The foregoing may represent a description or definition of the ninth aspect or facet of the invention in its broadest or most general form. Even as couched in these broad terms, however, it can be seen that this facet of the invention importantly advances the art.

In particular, the invention in its ninth aspect supplies a proofing facility that—interacting with a complementary target facility—can bring about the above-noted virtues of proofing and printing with just one data file in common. Once again, the preferences described for the other facets of the invention apply to this ninth one too.

The many foregoing operational principles and advantages of the invention will be more fully appreciated upon consideration of the following detailed description, with reference to the appended drawings, of which:

BRIEF DESCRIPTION OF THE DRAWINGS

FIG. 1 is a highly conceptual diagram of one prior-art proofing and printing arrangement, including basic facilities and information flow between them;

FIG. 2 is a like diagram of another such prior-art arrangement;

FIG. 3 is a like diagram of a basic arrangement according to preferred embodiments of the present invention;

As will be readily seen, these diagrams and particularly FIGS. 3 and 4 illustrate both method and apparatus features of the invention and its context.

DETAILED DISCUSSION

1. Recap of Conventional Proofing Inadequacies

Figure 4:
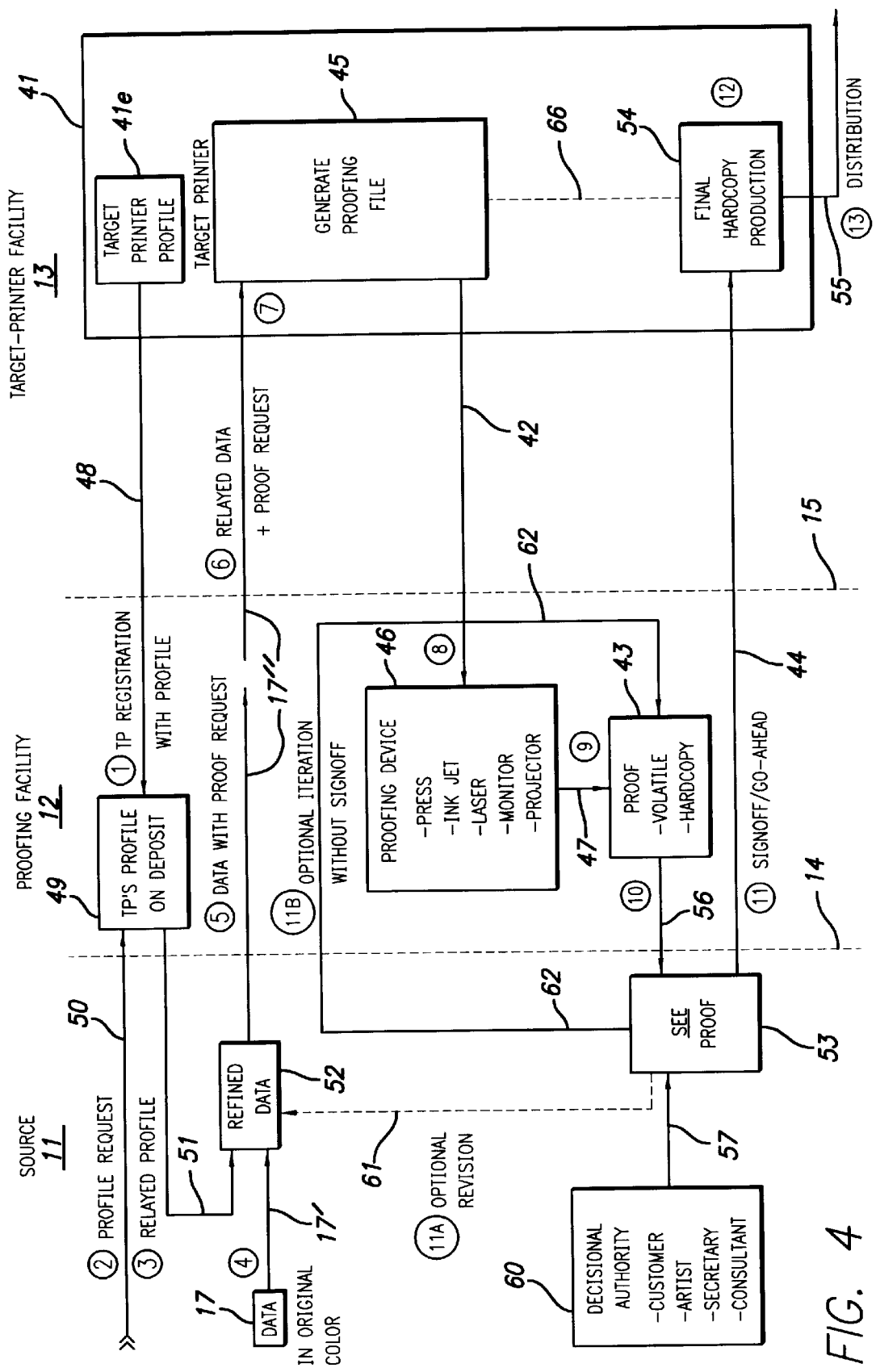
FIG. 4 is a like diagram of a more highly elaborated arrangement according to preferred embodiments of the present invention.

As a beginning of the printing process, the producer 11 of the content generates a document data file 17, which may include color information in any one of multiple formats —for instance RGB, CMYK or Pantone. Accompanying or incorporated into this file 17 are other printing specifications, enumerated earlier.

The overall end-objective is printing and delivery of a satisfactory hardcopy using a target printer 25. By trade practice, even though that printer may be operated in a facility 13 staffed by highly talented and responsible professionals, the question of what constitutes a "satisfactory" hardcopy is not for those staff members.

Rather that question is for, most typically, the customer or some other representative entity associated with the source 11. Herein lies the significance of the proof and of its formal acceptance or rejection.

In one conventional method of generating a proof, the producer 11 (FIG. 1) of the content 17 converts 21 all the colors 17' in the image into the native color 24 of the target printer 25, based upon information 16 received from the target facility 13 about that native color. As the drawing suggests, this conversion 21 may instead be performed at the proofing facility 12.

In any event, in this method the proofing facility 12 forms a variant or proofing file 22, also derived from the conversion process. Next the proofing facility 12, based on that proofing file 22, attempts to make an acceptable proof 23.

That proof is submitted to someone who has authority to accept or reject it on behalf of the customer. If it is rejected the parties usually iterate, trying to get the color and other specifications right, until a subsequent proof is accepted—although occasionally a disagreement may develop that leads to abandonment of the project.

Upon an okay of the proof 23, the target facility 13 tries to use the supposedly native-color file 24 in the target printer 25 to print the desired hardcopy. Of the two efforts, the proof 23 is more likely to represent how the image should appear; but its correspondence to the final hardcopy is far from certain.

This method requires coordination between the content producer 11 and the target facility 13—not merely a onetime provision of limited information 16, but an ongoing coordination. For a high-artistic-quality project this collaboration must be maintained, and at a relatively advanced and detailed technical level.

In another conventional method of producing a proof, the content producer 11 (FIG. 2) converts 31 all the colors 17' to a certain standard color space—for example a typical printing-press device space, or a perceptual space such as the industry-recognized CIEL★A★B★ space. The proofer then tries to make a proof 33 based on the resulting data file 32, or in other words uses that data file as a proofing file.

This effort again is quite likely to display a version of the image color which is correct in an absolute sense. That, however, is of course not the point, since the content producer 11 already knows how the image is supposed to look. What the producer wants to know is how the image will look in the final hardcopy.

The proofer 12 does send the same data file 32 (a duplicate of the proofing file) to the target facility 13, but that file 32 cannot be used in the target printer 36. Not even nominally is the proofing file 32 compatible with the target printer 36.

It must be adapted 34 by the target facility to form a data file 35 expressing the image colors in target-printer color space. Now the accuracy of the proof is restricted to the accuracy of the emulation of the standard color 32 on the target printer 36. This can be a difficult problem.

The drawings represent three separate domains, identified from left to right across the top and separated by dashed vertical lines 14, 15:

the content creator—i.e. the source or originator 11 of the image data 17 and other information to be incorporated into the final hardcopy printout;

the proofing facility 12, which prepares the proof as such, and also transmits information and in some cases performs data transformations; and the target-printer facility 13, which maintains the target printer 36 itself and provides information (in various forms) about that printer, prints the final hardcopy, and in some cases performs data transformations.

For purposes of the invention, it is important that the proofing and target facilities 12, 13 be distinct—and in the earlier "Summary" section of this document an effort has been made to define this concept somewhat rigorously. In less-formal terms, the dashed vertical line 15 between these two facilities is a relatively hard-and-fast demarcation.

The dashed vertical line 14 between source and proofing facilities 11, 12, by comparison, may be perceived as much more fuzzy, or less firm. As suggested by the drawing of the preliminary conversions 21, 31 partially straddling this vertical line 14, it is not important to understanding of the prior art (or the invention) whether those particular conversions are performed at the source or at the proofer.

In fact as a practical matter those conversions and related functions are sometimes performed in one of these two domains 11, 12 and sometimes in the other. As suggested in the "Background" section of this document, the source domain 11 itself may be fragmented in a variety of ways—so that the overall cast of characters includes customers, non-customer end-users, advertising agencies, job-shoppers, printing brokers, graphic artists, fine artists, consultants, and other value-adders (and in some cases pure go-betweens), with all of these in turn grading into identities or functions of the proofing facility 12.

Thus the source and proofing domains 11, 12 are separated from each other in the drawing primarily as a manner of descriptiveness, i.e. as an aid to general understanding; whereas they (considered together) are discrete relative to the target domain 13 in a more substantive way. These characteristics of the source, proofing and target facilities and divisions between them 11–15 are carried forward into the following detailed discussion of preferred implementations of the invention.

2. A Preferred Embodiment of the Invention

This method substantially eliminates the limitations of the prior-art methods discussed above. Here as before the producer 11 of the content generates a document data file 17, which includes color information in any agreed-upon format—RGB, CMYK, Pantone, or any other of multiple recognized formats.

This file is sent over 17', 17" to the target printer 41. The target printer (or more broadly speaking the target-printer facility 13) generates a proofing and printing file 42.

To generate the proofing/printing file 42, the target facility 41 takes into account its own color reproduction capabilities and may follow either of two main alternative procedures that will be discussed shortly. In any event the new file 42 is sent to the proofing facility 12, which uses that file to produce a proof 43. As mentioned earlier, the proof 43 may itself be a hardcopy, or a computer-monitor display, or even a projected image—provided only that the form of presentation, with all the intrinsic limitations of that form, is acceptable to the parties.

In the illustrations, the horizontal line or lines 17', 17" may be regarded as a data link from the image source 11 (or proofer 12, or both) to the target printer facility 41. Similarly the horizontal line or lines 42 may be conceptualized as a data link from the target facility 13 to the proofer 12.

If the proof 43 of the desired document is satisfactory, the proofer 12 or the source 11 returns an acceptance 44 to the target printer 41, which then operates to print the final hardcopy using the same file 42 that was sent to the proofer 12. Note that this procedure requires the target printer 41 to use substantially the selfsame file which the target facility 13 itself generated and provided to the proofer.

In other words, it is the target printer 41, 13 which proposes and promulgates its own specifications 42, though these are derived from the original data 17 provided by the source. Now the proofer 12 is doing no more than facilitating, in an industry-standardized way, review of these specifications by a suitable representative of the source 11.

Before printing, certain kinds of changes may be made to the data file 42 without disturbing the understanding expressed above that "substantially the selfsame file" is used in printing. For instance, operating personnel in the target facility may add their own internal approvals to the file—or in various ways the file may be unlocked for use in production, or may be locked against further change, or may be annotated with production schedules, prices, press operator's comments, running time or times, pressrun yield, profitability, shipping details etc. The point is that the color data, color space, technical specifications etc. are not materially changed after the acceptance 44.

From that point forward, so long as the target facility scrupulously adheres to its own specifications 42, the outcome should be secure. Of course if the target facility deviates from its own specs, then at least liability for any divergent outcome is plain.

One way to generate the proofing file is to convert 41a all the colors in the document into the internal native color of the target printer 41, and to append to (or incorporate into) that file the current I. C. C. profile 41b of the target printer 41. The result of this conversion is thus a composite data file 41c, which is then sent over 41d to the proofing facility 11 as the proofing file.

In this case, when actually producing the proof 43, the proofer is expected to religiously apply the details of the current I. C. C. profile 41b together with the data file 41a (which is expressed in target-printer space). As noted earlier, this is well within the routine state-of-the-art capabilities of a competent proofing facility; and if the proofer 12 performs this routine step competently (and the target facility does likewise with respect to the final hardcopy) then the visible proof will be an accurate advance representation of the final document appearance.

Another way to generate the proofing file is instead to convert 41a' the source-supplied data 17', 17" into a new data file 41b' expressing the same information in device-independent, perceptually accurate color space—but once again using all the knowledge which the target facility 13 has about its own capability to print from such a file. That file 41b' is then provided as the proofing file 42 to the proofer 12, for use in preparing the proof to be shown to the source representative. Once again, the problem for the proofer is reduced to an absolutely routine standardized process.

(Regardless of whether the system uses this proofing-file conversion method 41a' or the earlier-discussed conversion 41a to target-printer color, the conversion is most typically performed in a processor 64–65. This may be a processor 64 internal to the target printer, or a processor 65 external but connected with that target printer—or partly in each 64, 65 as illustrated. The external processor 65 most typically may be part of a suitably programmed general-purpose computer, or computer system, or raster image processor. A like processor 66 is typically associated with operations of the proofing facility as shown.)

In either case, it is the target facility 13 and printer 41, not the source or the proofer, that produce the controlling data file 42—which is then used to produce both the proof and the final hardcopy in common. At all stages, furthermore, the target facility retains its control over the production process as such.

The target facility 13 may determine, upon receiving a go-ahead 44, that its own data file (either color data 41a, 41a' as such, or ancillary specifications 41b) can no longer be regarded as appropriate for use in printing the job. Ideally such a discovery may be triggered automatically when the machinery 41 refuses to operate from a currently invalid file 42.

Then of course the target personnel must stand down, override the acceptance 44, prepare a new proofing file 42 using current profile information etc., and direct the proofer 12 to show a new proof 43. For the target facility 13 to do anything else is to proceed at its own peril —but at least the problem is confined to bits and bytes, proof and reproof, without any stack of incorrectly printed hardcopies to discard or possibly to reship.

Another straightforward equivalent is to produce the proof 43 based upon a substantial duplicate of the proofing file 42, rather than upon the file 42 itself. There are ample practical reasons for doing so, and in fact when network transmissions are taken into account the distinction between the file 42 and a duplicate becomes little more than semantics.

Yet another variant is that the content originator define the data 17 (FIG. 3) in target-printer color space (device-color space). This is permissible if the originator prefers it; however, such an approach gains little as it is subject to validation of the target printer's characteristics by the target facility: this validation then is equivalent to conversion, by the target facility, into the target printer's color space as described earlier. Otherwise this variant would tend to reintroduce some prior-art difficulties outlined earlier.

An advantage of this invention is that the proof is produced using the same color-management capabilities available in the target printer—i.e. the target printer's color characterization. This is true whichever of the two alternative procedures 41a–41d or 41a'–41b' is chosen for generating the proofing file 42.

Another advantage is that the proof is produced using the same data from which the hardcopy will be printed. The content producer is prevented from mistakenly sending different data to the printer and proofer.

3. Another Preferred Embodiment of the Invention

The discussion in the preceding subsection 2 is directed to a relatively streamlined form of the invention seen in FIG. 3. That form is advantageously embedded in a more-complete procedure which includes added important precautionary steps as shown in FIG. 4 and enhances the overall effectiveness of the invention.

Here the order of steps in the method is denoted in the drawing by encircled numbers, although the precise order of several early steps is somewhat arbitrary. Typically the first step is registration 48 of the target printer 41—particularly including its I. C. C. profile (enabling conversion into CIEL★A★B★ or other standard color space)—in the proofing facility 12.

The profile 41e, initially residing at the target facility 13, is not necessarily the same as the current and job-specific profile 41b (FIG. 3) that will later be used in generating the proofing file as described in subsection 2 above. Rather, the initially registered profile 41e—which becomes the target-printer profile 49 on deposit with the proofer 12—is only a preliminary, generalized profile for the target printer 41.

A typical second step is a request 50 from a graphic artist or someone else associated with the content originator 11 for a copy of that registered profile 49. In the third step, the proofing facility 12 responds with a relayed copy 51 of that profile. This allows the content originator to apply color transformations and predict how the final printed output will appear nominally.

As the fourth step the content provider 11 may then if desired feed specific image data 17, 17'—together with the profile information 51—into a process that produces a preliminarily refined data set 52. These early steps may resemble some of the prior-art procedures described in the "Background" section of this document and also in subsection 1 above; but here they are not final, only preliminaries aimed at narrowing any possible gap between color spaces used in defining the original data 17 and in operations of the target printer 41.

In the fifth step, the refined data 52 (or possibly the original data 17, if steps 1 through 4 have been omitted) are provided to the proofer with a request 17" for a proof. The sixth step, performed by the proofer 12, is a relaying of these same proof request and data 17" to the target facility 13.

That facility then as the seventh step generates 45 a proofing file 42. This latter seventh step 45 is identical to one or the other of the two previously discussed alternatives 41a–41d or 41a'–41b' of FIG. 3, resulting in the proofing file 42.

Preferably the data 17, 17', 17" and therefore the proofing document 42 contain additional information about the desired hardcopy, such as crop or bleed marks 101 (FIG. 5), fold lines, artwork insertion and overall assembly instructions, and any other desired controlling data 102 such as document and source names, proofing-facility identification, special inking instructions, shipping details, and date. Preferably to the extent possible all such data 102 are in the form of automatic machine control parameters—so that target-facility personnel have minimal need to hand-enter such control settings—yet reasonably subject to human review and intervention (to counteract the propensity of computers for doing what is legal but absurd).

Each page of image data 41a (FIG. 5) in the proofing data file 41a may be divided into smaller subsets 41a$_{22}$, 41a$_{23}$, . . . 41a$_{25}$ of data for separate use in the target printer—the subscripts here referring to number of column and then row of the respective subset, as exhibited in the drawing. Usually the target printer supports a larger page size than a proofing device can; thus after transmission 42 of all the data 41a$_{nn}$ subsets from target facility 13 to proofer 12, the latter produces a proof 43 in the form of an overall image that has been correspondingly subdivided into smaller pages 43$_{22}$, 43$_{23}$, 43$_{24}$, 43$_{25}$ etc.

Even when original data 17 are in vector form, for reasons stated earlier the proofing file 41a, 41c, 42 is preferably prepared in rasterized form. This is suggested in FIG. 5 by an enlarged 103 view of a portion of the data, showing data in a pixel-grid format—and also by an enlarged 104 view of a corresponding portion of the proof image, likewise showing visible image elements in a pixel-grid format.

Images in the proofing data file 41a are advantageously reduced in resolution (i.e. coarsened) to make that file smaller and easier to communicate. It is intended to suggest this in FIG. 5 by a relatively small number of data pixels in the enlarged 103 view of data in a representative one data subset 41a$_{48}$ (fourth column, eighth row)—and accordingly small number of proof image pixels in the enlarged 104 view of the corresponding small page 43$_{48}$. Generally the resolution in a proof need not be as high as the resolution for final hardcopy printing.

Figure 5:
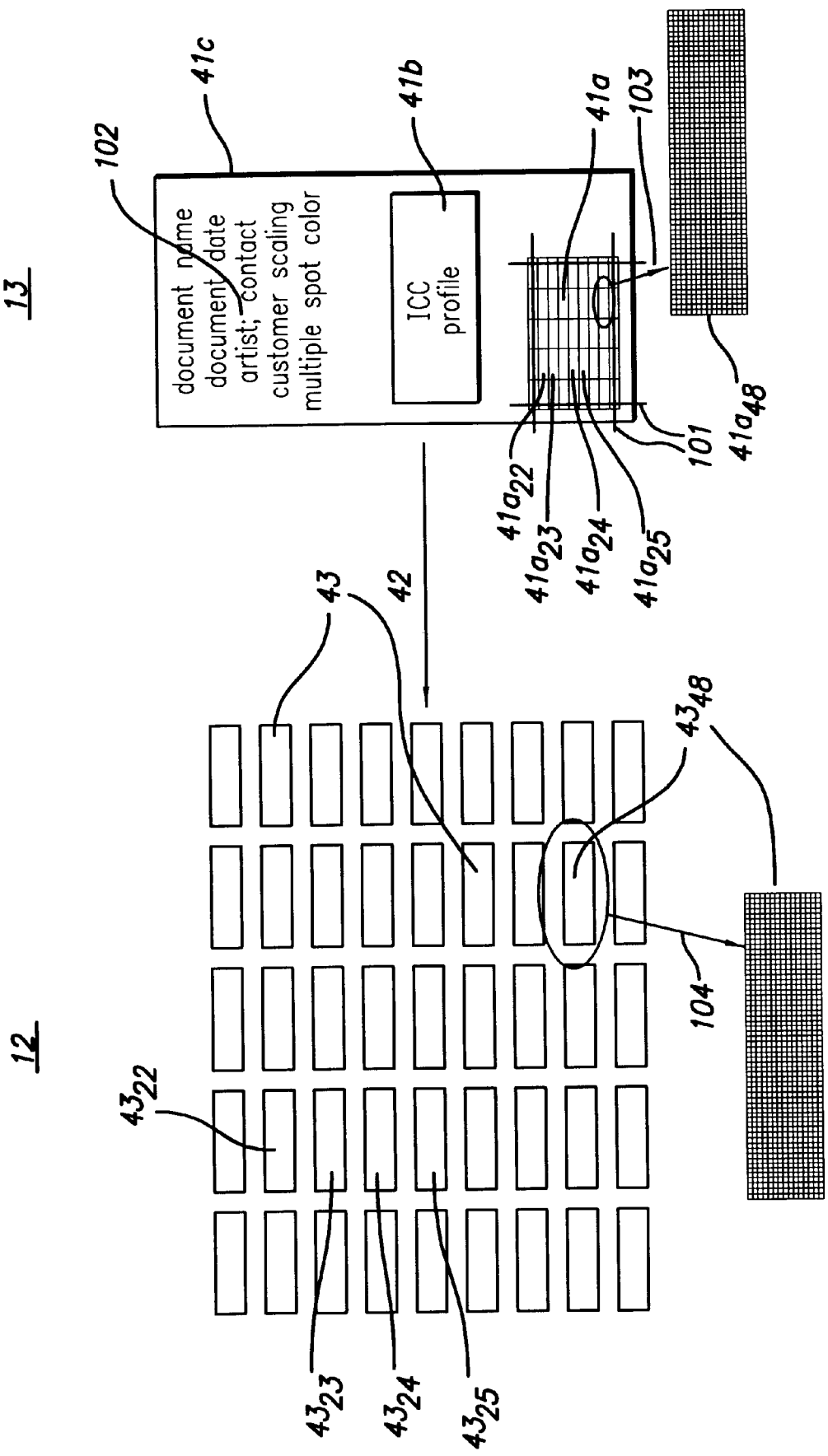
FIG. 5 is a diagram showing contents of the original image data, and of the proofing document and the proof.

FIG. 5 illustrates several different features of the invention which are amenable to practice together, just as shown. It is not intended thereby to suggest, however, that these features must be so practiced necessarily. To the contrary, the rasterization, coarsened resolution, subdivision of data for subpage proofing, and incorporation of operating parameters into the proofing file are all amenable to practice separately as appropriate to the overall circumstances.

In the eighth step, the target facility 13 sends this proofing file 42 off to the proofer 12, and in particular to the proofing device 46. The latter as indicated may take any one of a variety of forms, provided only that the parties all acquiesce with full knowledge of the limitations of some proofing devices.

Thus for instance, on the one hand, color gamut or colorimetric resolution in some laser printers may be inferior those of an offset proofing press or an inkjet printer. On the other hand a computer monitor or projection system may fail to convey the same impression as the image printed on textured, glossy or other special printing media.

Although the eighth step is here described and shown as action by the target facility 13 in response to the request from the proofer 12, equivalently instead the proofing facility may take action to retrieve the finished proofing document from the target facility. Still equivalently, the fifth and sixth steps may instead be collapsed into a single action by the source 11.

Further equivalently the source may retrieve the proofing document from the target facility and forward it to the proofer 12. As previously suggested, the demarcation between identities and functions of the source and proofer is relatively fuzzy; accordingly a great deal of variation and latitude must be allowed in these steps, all equivalents within the scope of certain of the appended claims.

In any event one or more proofing devices 46 are used in the ninth step 47 to produce a proof 43 in one or more forms. The proofing facility 12 uses the I.C.C. profile 41b (FIG. 3) if present in the proofing document—or otherwise the perceptual-space data 41b'—to produce an accurate reproduction of the color and other details that are to be expected from the final printer.

In the tenth step this visible simulation 43 is physically brought together 56, 57 with the decisional authority 60 for an actual viewing 53 of the proof. What happens next depends on what that authority 60 thinks of the proof.

If the person or people with authority to make the decision approve of the job as represented by the proof 43 (with understandings about device limitations), then the proof viewing may result in the authoritative entity 60 signing off on the job—possibly subject to appended or incorporated comments. If such annotations are present but not regarded as critical enough to delay the work, this becomes the eleventh step (identified with the encircled number "11") in the drawing: the proofer 12 (or the source 11, possibly by way of the proofer) provides the now-annotated file as a go-ahead 44 back to the target facility 13. Production using the target printer may then proceed. (Depending on the specific protocol agreed to, this final hardcopy production may be based either upon the returned annotated file 44 or—as suggested by the dashed vertical line—upon a duplicate 66 of the unannotated proofing file 42 transmitted from target to proofer earlier; but for the annotation, these two files 44, 66 should be identical.)

The decisional authority may, however, instead decide that the proof suggests some more-significant deficiency either in the data 17" as provided in the fifth and sixth steps or in the proofing-file generation/proofing 45–47 of the seventh through ninth steps—or possibly both. If the former is suspected, then as an alternative eleventh step (numbered with encircled "11A") the decisional authority may optionally call for a revision 61 of the refined data 52, followed by generation 45 of a new proofing file 42, new proof 43, and new viewing 53.

In the trade this alternative eleventh step may correspond to a conventional final postproof "retouching" by the graphic artist. Within the scope of the present invention, this alternative amounts to a reinitiation of a relatively more-basic method of the invention, as the retouched data 52 are now again submitted with a new proof request as at 17", followed by a new proofing file 45, new proof 43, and new showing 53.

If instead at the first showing 53 it is error in the first proofing-file generation/proofing 45–57 which is suspected, then as a different alternative eleventh step (numbered with encircled "11B") the decisional authority may optionally call for a rework 62 of the proofing-file generation 45 or proof generation 47 (or both), without data revision 61. Typically the difference between these two alternatives 61, 62 may occasion some different allocation of the cost of the proofing rework.

In any event, iteration with or without data revision 61 in principle may proceed through several cycles, particularly for a relatively very expensive fine-art reproduction or a complex, highly demanding presentation piece. After such iteration eventually the proofing process leads to a go-ahead 44 as described above.

As in the prior art, for some extreme cases the proofing process may lead to aborting the project, if the parties cannot agree on the cause of dissatisfaction with a proof or if they cannot come to terms as to corrective action. In the great majority of cases, however, there is no iteration at all, and the eleventh step is simply the go-ahead 44 as described earlier.

An important mode of implementing many of the steps shown in FIGS. 3 and 4 is for the proofing facility or the target facility to maintain an automatic server, accessible by private network or via the Internet. The various parties can upload files to the server and download them from the server as appropriate.

Although some files may be possibly susceptible to passage by electronic mail, in many cases they are much too large for such transmission in one piece; thus, uploading (e.g. by file-transfer protocol, FTP) and downloading through the 'Net will be much easier. To prevent tampering for idle vandalistic purposes, and in some cases to safeguard sensitive materials, strong encryption as by long-key PGP systems is advisable.

To make certain that posted files are not overlooked, an automatic receipt-and-notification subsystem may be incorporated. Alternatively (or in addition) the parties can confirm transmission and receipt by manually initiated e-mail or FAX, or by voice telephone.

The above disclosure is intended as merely exemplary, and not to limit the scope of the invention—which is to be determined by reference to the appended claims.

What is claimed is:

1. A method of generating an advance proof of an image that is to be printed, at a target printer facility, based upon an original image data file in a particular color space; said method comprising the steps of:
   the target facility converting the original file to a different color space to form a proofing data file; and
   provision of the proofing file to a proofing facility distinct from the target facility.

2. The method of claim 1, wherein the converting step is selected from the group consisting of:
   converting the original file into target printer native color space, and
   converting the original file into a perceptual color space.

3. The method of claim 1, further comprising the step of:
   the proofing facility applying the proofing file to produce a proof.

4. The method of claim 3, wherein:
   the proof is a computer-generated volatile display.

5. The method of claim 3, wherein:
   the proof is a hardcopy.

6. The method of claim 5, wherein:
   the proofing file corresponds to a page size larger than the proofing facility can print, but is subdivided into data subsets individually sized for printing in the proofing facility.

7. The method of claim 1, wherein:
   the converting and providing steps are performed automatically.

8. The method of claim 1, further comprising the step of:
   the proofing facility also applying a target-printer color-characterization profile in producing the proof.

9. The method of claim 1, wherein the providing step comprises:
   the target facility also providing to the proofing facility substantially concurrently a target-printer color-characterization profile.

10. The method of claim 9, further comprising the step of:
    the proofing facility also applying the target profile in producing the proof.

11. The method of claim 1, wherein:
    the proofing facility is remote from the target facility.

12. The method of claim 1, wherein the converting step is performed by a processor selected from the group consisting of:
    a processor in a target printer at the target facility; and
    a processor in a computer interconnected with the target printer.

13. The method of claim 1, wherein the proofing file further comprises information about the image selected from the group consisting of:
    cropping positions;
    scaling multiple;
    spot color;
    an image-document name;
    an image-document date;
    identification of one or more people associated with the image; and
    identification of one or more organizations associated with the image.

14. The method of claim 1, wherein:
    the proofing file is at a coarser resolution than the original file.

15. The method of claim 1, further comprising the step of:
    before the applying step, the target facility registering with the proofing facility a target printer and corresponding color characterization profile.

16. The method of claim 15, wherein:
    after the registering step and before the supplying step, image-generation personnel retrieving the registered color profile and using the profile to refine the data to specify a more nearly desired hardcopy color at the target printer.

17. The method of claim 15, further comprising the step of:
    the target facility receiving the original file.

18. The method of claim 1, further comprising the steps of:
- before the supplying step, image-generation personnel presenting the original file to the proofing facility and requesting a proofing document from the proofing facility; and
- the proofing facility then performing said supplying step and also requesting a proofing file from the target facility.

19. The method of claim 18, further comprising the steps of the image-generation personnel:
- viewing the proof;
- annotating the proofing file based on viewed color quality of the proof; and
- furnishing the annotated proofing file to the proofing facility.

20. The method of claim 18, further comprising the steps of:
- the image-generation personnel viewing the proof, refining the original file based on viewed color quality of the proof, and supplying the refined file to the proofing facility;
- the proofing facility supplying the refined file to the target facility with a request for a refined proofing file;
- the target facility converting the refined file into target-printer native color space, to form a refined proofing file;
- the target facility providing the refined proofing file to the proofing facility;
- the proofing facility applying the proofing file to produce a refined proof; and
- the image-generation personnel viewing the refined proof and approving it.

21. The method of claim 1, wherein:
the converting step comprises transforming the data into rasterized form, as part of creating the proofing file.

22. A method of printing an image, based upon an original image data file in a particular color space; said method comprising the steps of:
- a target-printer facility converting the original file to a different color space to form a proofing data file;
- provision of the proofing file to a proofing facility distinct from the target facility;
- the proofing facility applying the proofing file to produce a proof; and
- the target facility applying said proofing file to produce a final hardcopy of the image;
- whereby the said proofing file is applied to producing both the proof and the final hardcopy.

23. The method of claim 22, wherein the converting step is selected from the group consisting of:
- converting the original file into target printer native color space, and
- converting the original file into a perceptual color space.

24. The method of claim 22, further comprising the step of, before the converting step:
image-generation personnel supplying the original file, in the particular color space, to the target printer facility.

25. The method of claim 24, further comprising the step of:
the image-generation personnel viewing and approving the proof.

26. The method of claim 22, wherein the providing step comprises:
the target facility also providing to the proofing facility substantially concurrently a color characteristic profile of the target facility.

27. The method of claim 22, wherein:
the converting step comprises transforming the data into rasterized form, as part of creating the proofing file.

28. The method of claim 22, wherein:
the proof is a hardcopy.

29. The method of claim 28, wherein:
- the proofing file corresponds to a page size larger than the proofing facility can print; but
- the proofing facility's applying step comprises subdividing the proofing file into data subsets individually sized for printing in the proofing facility.

30. The method of claim 22, wherein:
the converting and providing steps are performed automatically.

31. The method of claim 22, further comprising the step of:
the target facility associating with the proofing file a target-printer color-characterization profile.

32. The method of claim 31, further comprising the step of:
the proofing facility also applying the associated target profile in producing the proof.

33. The method of claim 22, wherein:
the proofing facility is remote from the target facility.

34. A method of printing an image, based upon an original image data file in a particular color space; said method comprising the steps of:
- a target-printer facility converting the original file to a different color space to form a proofing data file;
- the target facility applying the proofing data file or a substantial duplicate thereof to form a subdivided derivative of the proofing data file;
- provision of the subdivided derivative to a proofing facility distinct from the target facility;
- the proofing facility applying the subdivided derivative to produce a proof in subdivided portions; and
- the target facility applying said proofing file to produce a final hardcopy of the image;
- whereby the said proofing file is applied to producing both the proof and the final hardcopy.

35. The method of claim 33, wherein:
- the proofing file corresponds to a page size larger than the proofing facility can print; but
- the subdivided derivative comprises respective data subsets of the proofing file that are individually sized for printing in the proofing facility.

36. A system for printing an image, based upon original image data, in a particular color space, supplied by image-generation personnel; said system comprising:
- a target printer facility, comprising a target printer, receiving such data from such personnel and converting such original data to a different color space to form proofing data; and
- distinct from the target facility, a proofing facility receiving the proofing data and applying the proofing data, together with a color characteristic profile of the target facility, to produce a proof;
- wherein said target facility also applies said proofing data to print a final hardcopy of the image;
- whereby a common proofing file is applied both to producing the proof and to printing the final hardcopy.

37. A target printer facility for printing a final hardcopy of an image based upon original image data, in a particular color space, supplied by image-generation personnel; and for cooperating with a proofing facility that is distinct from the target facility; said target printer facility comprising:

- a target printer that prints the final hardcopy of the image;
- a communication link for receiving such data from such personnel;
- one or more computer subsystems for converting such original data to a different color space to form proofing data; and
- a further communication link for transmitting the proofing data to such distinct proofing facility for use, together with a color characteristic profile of the target facility, in producing a proof.

38. A target printer facility for printing a final hardcopy of an image, based upon original image data, in a particular color space, supplied by image-generation personnel; and for cooperating with a proofing facility that is distinct from the target facility; said target printer facility comprising:

- a target printer that prints the final hardcopy of the image;
- a communication link for receiving such data from such personnel;
- one or more computer subsystems for converting such original data to a different color space to form proofing data;
- a further communication link for transmitting the proofing data to such proofing facility for use, together with a color characteristic profile of the target facility, in producing a proof; and
- wherein the target printer and computer subsystems comprise means for applying the proofing data to print the final hardcopy;
- whereby a common proofing file is applied both to producing the proof and to printing the final hardcopy.

39. A target printer facility for printing a final hardcopy of an image, based upon original image data, in a particular color space, supplied by image-generation personnel; and for cooperating with a proofing facility that is distinct from the target facility; said target printer facility comprising:

- a target printer that prints the final hardcopy of the image;
- a communication link for receiving such data from such personnel;
- one or more computer capabilities for converting such original data to target printer native color space to form proofing data; and
- a further communication link for transmitting the proofing data, together with a color characteristic profile of the target facility, to the distinct proofing facility for use in producing a proof.

40. A proofing facility for producing a proof of an image, based upon a proofing data file; and for cooperating with a target printer facility that is distinct from the proofing facility and that prints a final hardcopy of the image; said proofing facility comprising:

- a device for producing the proof;
- a communication link for receiving such proofing data file from such target facility; and
- one or more computer subsystems for using such proofing data, together with a color characteristic profile of such target facility, in controlling the proof-producing device to produce a proof.

41. A proofing facility for producing a proof of an image, based upon a proofing data file and a color characteristic profile of such target facility; and for cooperating with a target printer facility that is distinct from the proofing facility and that prints a final hardcopy of the image based upon said proofing data file; said proofing facility comprising:

- a device for producing the proof;
- a communication link for receiving, from such target facility, such proofing data file and such color characteristic profile; and
- one or more computer subsystems for using such proofing data and such color characteristic profile, together, in controlling the proof-producing device to produce a proof;
- whereby a common proofing file is applied both to producing the proof and to printing the final hardcopy.

* * * * *